H. S. FRANK.
MANUFACTURE OF PISTON RINGS.
APPLICATION FILED MAR. 30, 1918.
1,295,150.
Patented Feb. 25, 1919.
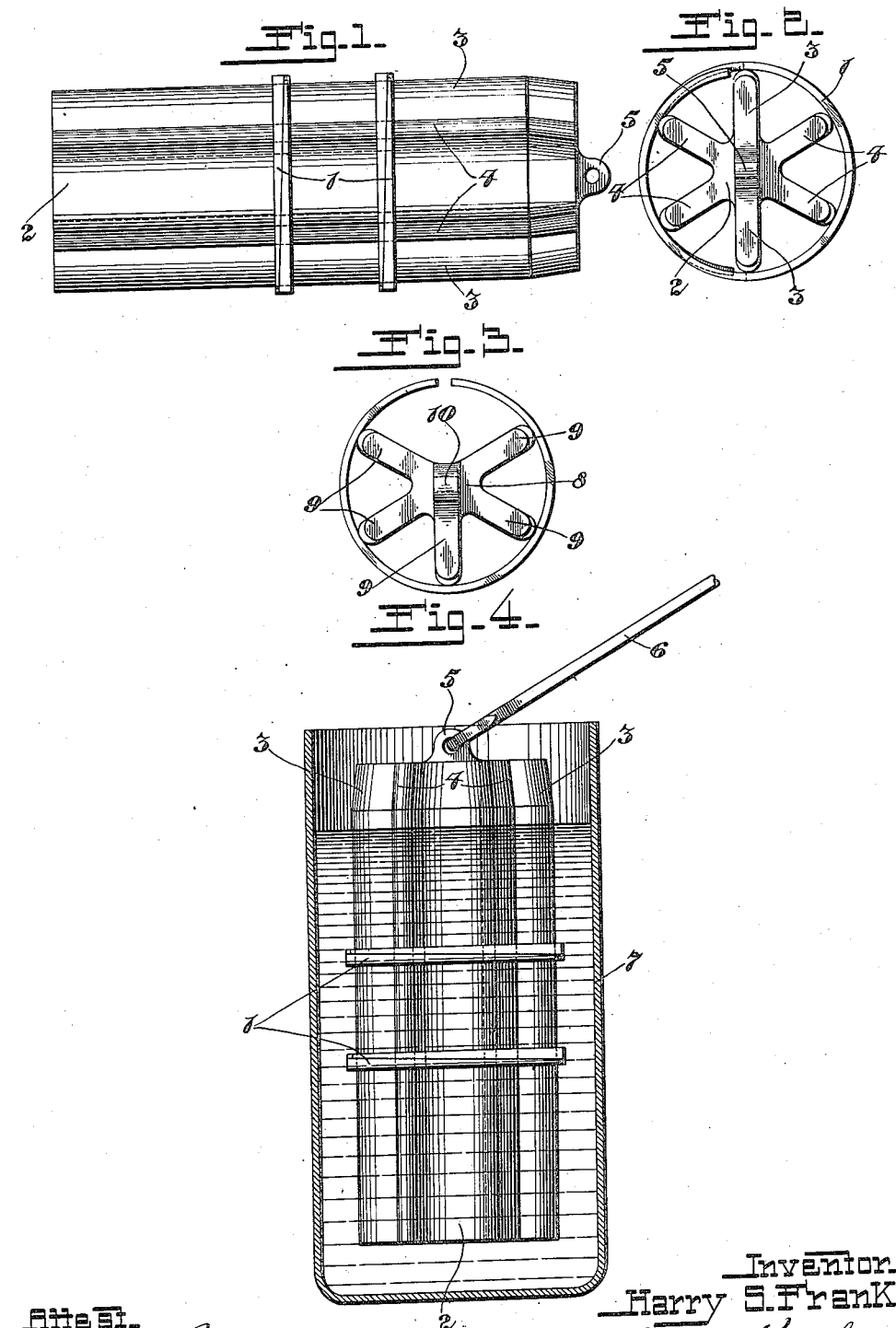
Inventor
Harry S. Frank,
By Rippey & Kingsland,
His Attorneys.
Attest
Charles A. Becket

UNITED STATES PATENT OFFICE.

HARRY S. FRANK, OF ST. LOUIS, MISSOURI, ASSIGNOR TO INLAND MACHINE WORKS, OF ST. LOUIS, MISSOURI, A CORPORATION.

MANUFACTURE OF PISTON-RINGS.

1,295,150.

Specification of Letters Patent.

Patented Feb. 25, 1919.

Application filed March 30, 1918. Serial No. 225,776.

*To all whom it may concern:*

Be it known that I, HARRY S. FRANK, a citizen of the United States, residing in the city of St. Louis and State of Missouri, have invented a new and useful Improvement in the Manufacture of Piston-Rings, of which the following is a specification.

This invention relates to the manufacture of piston rings.

When metallic piston rings are in their finished condition they are of a diameter in excess of the diameter of the cylinder in which it is intended they shall be used. When the rings are compressed within the cylinder it is desirable that they impart outward pressure against the cylinder wall as nearly uniform at all points in their circumference as it is possible to attain.

Various efforts have been made to produce rings which, when compressed within the cylinder, will impart equal pressure against the cylinder wall at all points throughout the circumference of the ring. If the ring is of uniform radial thickness throughout its circumference and is in the form of a perfect circle before being compressed within the cylinder, it will not impart equal pressure against the cylinder wall at all points in the circumference of the ring; but it will impart greater pressure in the segments of the ring extending for some distance from the respective ends of the ring, thus causing unequal wear upon the cylinder wall and interfering with the proper functioning of the ring. By the present invention piston rings may be produced in which the finished ring is not in the form of a perfect circle but is of such a form and shape that when compressed within the cylinder it will impart a uniform or equal pressure against the cylinder wall throughout the circumference of the ring.

An object of the present invention is to produce a device or apparatus for shaping piston rings so that when they are compressed within the cylinder for which they are intended they will impart a uniform pressure against the cylinder wall throughout their circumference.

In the accompanying drawings

Figure 1 is a side elevation of one form of a device or apparatus for shaping the piston ring.

Fig. 2 is an end elevation.

Fig. 3 is an end elevation of another form of device or apparatus for shaping a piston ring of another type.

Fig. 4 is a conventional illustration of the manner in which the molecular structure of the ring is changed and set in the modified or altered shape, so that when the finished ring is applied within the cylinder it will impart a uniform pressure against the cylinder wall throughout the circumference of the ring.

The device illustrated in Figs. 1, 2 and 4 is appropriate for the manufacture of the well known "inland" piston rings disclosed in John Flammang Patent No. 1,165,085, dated December 21, 1915, and rings of that type are shown upon the shaping device in Figs. 1, 2 and 4.

The inland ring has its ends overlapping and sprung together for a relatively considerable portion of its circumference, the overlapping portions being pressed together by the resiliency of the metal and, as illustrated in Fig. 1, it will be noted that the ends 1 of the rings are overlapped for a relatively considerable portion of the circumference of the rings, as stated.

My present invention is intended to expand these rings to a size in excess of the diameter of the cylinder for which they are intended, while segments at the ends of the overlapping portions are left on shorter radii of curvature than the sidewise adjacent portions of the ring, so that when the ring is compressed in the cylinder the segmental end portions will not impart greater, or at least not materially greater, pressure against the cylinder walls than the remaining portions of the ring, thus producing a ring which, when compressed in the cylinder, imparts equal, or very nearly equal, pressure against the cylinder wall throughout the circumference of the ring. In practice the rings are placed upon the shaping device constituting a part of the subject-matter of this invention and their shape is thereby changed; and while mounted on the device the molecular structure of the rings is changed to set the material in its changed shape which will be retained when the rings are removed from the device. The molecular structure may be changed and set in the changed shape of the rings by subjecting the rings to heat while they are held in their changed shape by the device on which they are mounted, or the rings may be set in their changed shape otherwise, as, for instance, by hammering.

As illustrated the device for changing the shape of the ring includes a central portion 2 having a plurality of radial arms 3 which, when inserted in the ring, impart outward uniform radial pressure at different points sufficient to expand the ring to a size in excess of the cylinder for which it is intended, while the end portions of the ring are left on shorter radii of curvature than the remaining portions of the expanded ring. As illustrated, the arms 3 are out of contact with the extremities of the ring, thus leaving the segmental end portions on shorter radii of curvature than the expanded portions of the ring. In shaping the inland rings I prefer that the expanding device be provided with other arms 4 which impart uniform outward pressure at different points of the ring while leaving the segmental end portions on shorter radii of curvature than the remaining portions of the ring. It is quite obvious that the number of the arms of the expanding device is wholly immaterial so long as the ring is given a shape in which the segmental end portions are on shorter radii of curvature than the remaining portions of the ring.

After the shape of the rings has been changed by mounting them upon the expanding device the molecular structure of the rings is changed to set the rings in their changed shape. As stated, this change in the molecular structure may be effected by subjecting the rings to heat, and in Fig. 4 I have conventionally illustrated one manner in which the change in the molecular structure may be effected. As shown, the expanding device includes an engageable part 5 adapted to be engaged by a supporting carrier 6 by means of which the rings while on the expanding device may be supported in the heat.

As shown in Fig. 4, the rings are immersed in a heating liquid or solution within a tank 7 and, in practice, are kept immersed in the liquid until the rings are heated to a dull red condition sufficient to change the molecular structure and set the rings in their altered shape. A satisfactory solution for this purpose is potassium nitrate, or sodium nitrate, or an equivalent. After the molecular structure of the rings has been changed they are removed from the device on which they were mounted and are ready for use, after being cooled.

In Fig. 3 I have illustrated my invention adapted for use for shaping an open resilient ring of ordinary construction in which the ends are circumferentially opposite. In the form of device illustrated in Fig. 3 there is a central portion 8 and a plurality of arms 9 which impart outward radial pressure at a plurality of points on the ring leaving the segmental end portions of the ring on shorter radii of curvature than the expanded portion of the ring. This device is provided with an engageable part 10 with which the supporting carrier 6 may be engaged to support the rings in the heat. These rings are also heated until their molecular structure is changed and set in the altered shape, so that when the rings are removed from the expanding device and cooled they are ready for use, and when applied within the cylinder will impart uniform pressure against the cylinder wall all around.

It will be observed by reference to the drawing that the arms are beveled at one end, so that the rings may be readily placed on the expanding device.

It is apparent that the specific form or shape of the expanding device may be changed and that the number of the arms thereon may be varied as desired without departing in the least from the principle of the invention.

What I claim and desire to secure by Letters Patent, is:—

1. A device of the character described, comprising a plurality of radial arms diverging outwardly adapted to expand a piston ring to a size in excess of the diameter of the cylinder for which it is intended, certain of said arms being widely spaced and leaving the end portions of the ring free from pressure thereby and curving on shorter radii of curvature than the remaining portion of the ring.

2. A device of the character described, comprising an elongated central portion, and a plurality of arms extending longitudinally of the central portion and diverging from each other and adapted to impart outward pressure to a piston ring at spaced points of contact, certain of said arms being widely spaced and being out of contact with and leaving the segmental end portions of the ring free from pressure thereby.

3. A device of the character described, comprising a plurality of integrally united radial arms of the same radial length diverging outwardly and adapted to impart outward pressure to a piston ring at spaced points of contact, and being wholly out of contact with the end portions of the ring, whereby the end portions are left free from pressure by said arms and on shorter radii of curvature than the expanded portion of the ring.

4. A device of the character described, comprising a long central portion, and a plurality of radial arms of equal radial length extending axially along said central portion and diverging outwardly and adapted to impart outward uniform radial pressure to a piston ring at separated points of contact, and being out of contact with the ends of the ring, whereby a part of the ring is expanded to a size in excess of the diameter of the cylinder for which it is intended, and the end portions of the ring are left free from pressure by said arms and on shorter radii of curvature than the expanded portion of the ring.

5. A device of the character described, comprising a plurality of integrally united radial arms of equal radial length and being of tapering radial length for a portion of their width and of the same radial length for the remainder of their length, said arms diverging outwardly and arranged to impart outward uniform radial pressure to a piston ring at spaced points of contact, and being wholly out of contact with segmental end portions of the ring whereby a part of the ring is expanded to a size in excess of the diameter of the cylinder for which it is intended and the end portions are left free from pressure by said arms and on shorter radii of curvature than the remaining portions of the ring, and means for supporting said device within a heating medium until the molecular structure of the rings is changed and the rings are set in their changed shape.

6. A device of the character described, comprising an element for imparting outward pressure to portions of a piston ring while relatively long segmental end portions are left free from pressure, whereby the shape of the ring is changed, so that the segmental end portions of the ring are on shorter radii of curvature than the remaining portions of the ring.

7. A device of the character described, comprising an element for imparting pressure to that portion of a piston ring intermediate the segmental end portions while the segmental end portions are left free from pressure, whereby the shape of the ring is changed, so that the segmental end portions of the ring are on shorter radii of curvature than the remaining portions of the ring, and means for supporting said device in a heating medium until the molecular structure of the ring material is changed and set in the changed shape.

8. A device of the character described, comprising a plurality of arms adapted to impart pressure to a portion of a piston ring at spaced points of contact and leave relatively long end portions thereof free from pressure, whereby the shape of the ring is changed so that the end portions of the ring are on shorter radii of curvature than the remaining portions of the ring, and a central supporting portion with which said arms are united.

9. Means for changing the shape of piston rings, comprising a device for imparting pressure to portions of the rings and leaving relatively long segmental end portions thereof free from pressure to change the shape thereof so that the segmental end portions of the rings are on shorter radii of curvature than the remaining portions of the ring, and means for supporting said device to subject the rings to heat while in their changed shape.

HARRY S. FRANK.